(12) United States Patent
Karnes et al.

(10) Patent No.: US 7,594,478 B2
(45) Date of Patent: Sep. 29, 2009

(54) TRUCK BED STAKE HOLE ASSEMBLY

(75) Inventors: Luther McKinley Karnes, Fort Gibson, OK (US); Brian Joe Karnes, Fort Gibson, OK (US); Roy Jeffery Lashley, Muskogee, OK (US)

(73) Assignee: Gameday, LLC, Muskogee, OK (US)

( * ) Notice: Subject to any disclaimer, the term of this patent is extended or adjusted under 35 U.S.C. 154(b) by 107 days.

(21) Appl. No.: 11/946,633

(22) Filed: Nov. 28, 2007

(65) Prior Publication Data

US 2009/0133616 A1 May 28, 2009

(51) Int. Cl.
*B60Q 1/30* (2006.01)
*B60Q 7/02* (2006.01)
*G09F 17/00* (2006.01)

(52) U.S. Cl. ............... 116/28 R; 116/173; 248/231.41; 248/534; 410/110

(58) Field of Classification Search ............... 116/28 R, 116/173, 174; 40/590, 591; 248/231.61, 248/499, 511, 536; 296/43; 410/101, 102, 410/106, 107, 108, 110, 111
See application file for complete search history.

(56) References Cited

U.S. PATENT DOCUMENTS

| | | | |
|---|---|---|---|
| 1,565,053 A | 12/1925 | Bozeman et al | |
| 2,601,088 A * | 6/1952 | Burgess | 248/539 |
| 3,351,356 A * | 11/1967 | Clark et al. | 410/110 |
| 3,381,925 A * | 5/1968 | Higuchi | 410/116 |
| 3,409,141 A | 11/1968 | Cunningham et al. | |
| 3,483,910 A | 12/1969 | Lalonde et al. | |
| 3,664,617 A * | 5/1972 | Fenwick | 248/539 |
| 3,950,010 A * | 4/1976 | Robertson | 410/110 |
| 4,162,100 A * | 7/1979 | Muscillo | 296/100.12 |
| 4,519,153 A | 5/1985 | Moon et al. | |
| 4,760,986 A * | 8/1988 | Harrison | 248/231.61 |
| 4,948,311 A * | 8/1990 | St. Pierre et al. | 410/107 |
| 5,108,141 A | 4/1992 | Anderson | |
| 5,141,277 A | 8/1992 | Alexander | |
| 5,215,346 A | 6/1993 | Reitzloff | |
| 5,273,382 A | 12/1993 | Yearick | |
| 5,326,203 A | 7/1994 | Cockrell | |
| 5,463,974 A | 11/1995 | Seeder | |
| 5,727,497 A | 3/1998 | Nichols, Jr. | |
| 5,738,471 A * | 4/1998 | Zentner et al. | 410/110 |
| 5,915,900 A | 6/1999 | Boltz | |
| 5,995,053 A | 11/1999 | Curtis | |
| D427,108 S | 6/2000 | Fisher et al. | |
| 6,290,441 B1 | 9/2001 | Rusu | |

(Continued)

*Primary Examiner*—R. Alexander Smith
(74) *Attorney, Agent, or Firm*—Head, Johnson & Kachigian

(57) ABSTRACT

A truck bed stake hole assembly comprising a shaft with a threaded end; a bottom plate shaped like a rectangle with a corner missing and with a threaded hole in which the threaded end is receivable; and a top plate with a downward extending post that aligns with the missing corner of the bottom plate and with a hole slightly larger than the threaded end. To use, the shaft is placed through the hole in the top plate and threaded into the hole in the bottom plate; the bottom plate is inserted into a truck bed stake hole; the top plate rests atop the stake hole; and the bottom plate is rotated to wedge within the stake hole. To remove, the bottom plate is rotated counterclockwise until the post in the top plate acts as a stop and prevents rotation, and the assembly is then removed from the stake hole.

24 Claims, 4 Drawing Sheets

U.S. PATENT DOCUMENTS

| | | |
|---|---|---|
| 6,295,945 B1 | 10/2001 | Amanze |
| 6,309,006 B1 * | 10/2001 | Rippberger ............ 296/100.16 |
| D464,912 S | 10/2002 | Powell |
| 6,536,827 B2 | 3/2003 | Oswald et al. |
| 6,557,483 B2 | 5/2003 | Nathan |
| 6,808,098 B1 | 10/2004 | Bickett, III et al. |
| 6,969,219 B2 * | 11/2005 | Speece et al. ............... 410/106 |
| 7,017,511 B2 | 3/2006 | Fisher et al. |
| D522,915 S | 6/2006 | Bruckler |
| D526,929 S | 8/2006 | Barrett |
| 2003/0084835 A1 | 5/2003 | Chao |
| 2005/0028722 A1 * | 2/2005 | Arntz ......................... 116/173 |

* cited by examiner

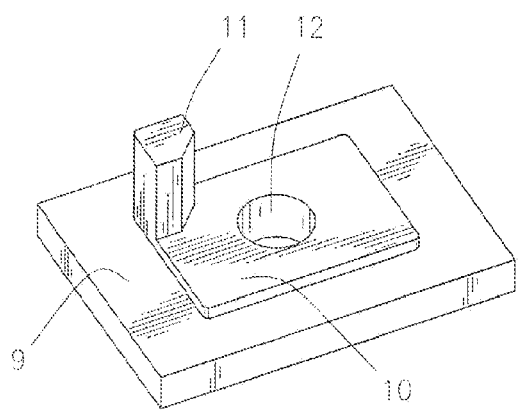
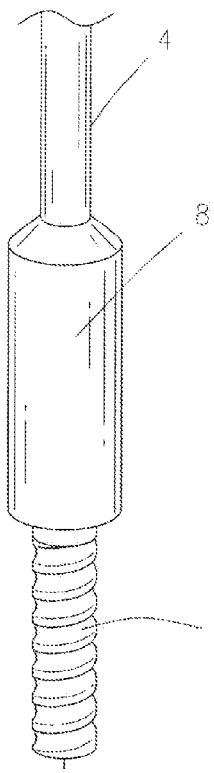
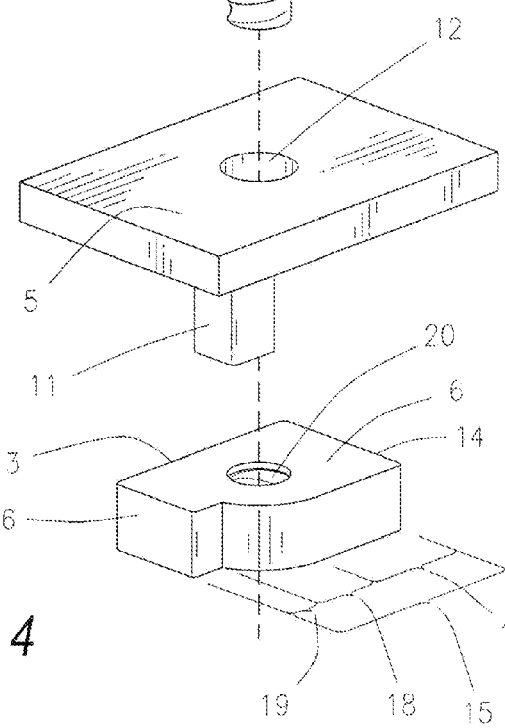
FIG. 3
FIG. 4

TRUCK BED STAKE HOLE ASSEMBLY

REFERENCE TO PENDING APPLICATIONS

This application is not based upon any pending domestic or international patent applications.

REFERENCE TO MICROFICHE APPENDIX

This application is not referenced in any microfiche appendix.

BACKGROUND OF THE INVENTION

1. Field of the Invention

The present invention generally relates to assemblies for attaching items to truck bed stake holes.

2. Prior Art

Truck bed side walls often include one or more holes, which provide access to enclosed areas within the truck bed side wall, known as stake holes or stake pockets. Such stake holes allow the truck user to attach various items, such as tie-downs, rails, canopies, bed liners, antennas, and flags, to their truck bed side walls. Such items are often attached semi-permanently, as with screws or bolts. Such attachment may be difficult and time-consuming, and removal may be even more so.

Difficult removal is a particular problem when the item attached via the truck bed stake hole is a flag. Adorning vehicles with flags, particularly American flags and flags supporting sports teams, is common. One popular method of attaching a flag to a vehicle is using a window-supported flagpole. However, such flagpoles have drawbacks, such as the need for the window to be partly open, allowing noise, rain, and other elements to enter the vehicle. Such flagpoles are often attached to the rear window of a car to reduce distraction to the driver; however, in a truck, this is often not an option. Therefore, it is desirable to attach a flagpole to the truck's bed rather than the truck's cab. The truck bed's stake holes provide an good location for attaching a flagpole. However, flags, particularly team flags, may be particularly vulnerable to being stolen or damaged. Therefore, it is desirable for the truck user to be able to easily remove the flagpole from the truck prior to leaving the truck somewhere where the flag may be in danger. Additionally, the user may wish to change the flag displayed depending on the season or a particular game being played on a given day. Therefore, ease of installation and removal is important.

Ensuring that an item is attached securely to the truck bed stake hole is also important. As trucks travel, particularly down highways at high speeds, insecurely attached items may become loose and separate from the truck, presenting a hazard to the truck's occupants and to other drivers and bystanders. Therefore, ability to withstand great speeds and changes in speeds without becoming loose is important.

Based on the foregoing, there is a need for an easy to install, easy to remove assembly for attaching items to a truck bed securely using the truck bed's stake holes. There is a need for a simple, easy to use assembly that may be installed or removed in seconds, but that provides secure hold for the items attached.

BRIEF SUMMARY OF THE INVENTION

The present invention is a truck bed stake hole assembly comprising a shaft with a threaded end, a bottom plate, and a top plate. The bottom plate has sides 1, 2, 3, and 4, where sides 1, 2, 3, and 4 generally comprise a rectangle with a corner missing. Sides 1 and 3 are generally parallel to each other and sides 2 and 4 are generally parallel to each other. Side 1 is shorter than the length of a truck bed stake hole but longer than the width of the truck bed stake hole. Side 2 is perpendicular to and adjacent to side 1 and is shorter than the width of the truck bed stake hole. Side 4 is perpendicular to and adjacent to side 1, is parallel to side 2, and is shorter than side 2. Side 3 is comprised of sections 1, 2, and 3, where: section 1 is perpendicular to and adjacent to side 2, is parallel to side 1, and is roughly half the length of side 1; section 3 is perpendicular to and adjacent to side 4, is parallel to side 1, and is roughly one quarter of the length of side 1; and section 2 is outwardly curved and is adjacent to sections 1 and 3 such that section 2 connects sections 1 and 3. The corners of the bottom plate may be curved. The bottom plate has a threaded hole in which the threaded end of the shaft is threadably receivable. The hole may be centered on the bottom plate The top plate comprises a top piece and a post, and may further comprise a bottom piece. The top piece is generally rectangular in shape. It has a length that is longer than the length of the truck bed stake hole and a width that is wider than the width of the truck bed stake hole. The bottom piece projects from the bottom of the top piece, and is generally rectangular is shape with sides roughly parallel to the sides of the top piece, it has a length that is shorter than the length of the truck bed stake hole and a width that is narrower than the width of the truck bed stake hole such that the bottom piece is receivable in the truck bed stake hole, where the length, is approximately equal to the length of side 1 of the bottom plate and the width is approximately equal to the length of side 2 of the bottom plate. The corners of the bottom piece may be curved. The post extends downward, and is located in a corner of the bottom piece when the top plate includes a bottom piece. The top plate has a hole that is slightly larger than the threaded end of the shaft. The hole may be centered in the top plate, and the bottom piece may similarly be laterally centered on the top piece.

The threaded end of the shaft extends through the hole in said top plate and through the threaded hole in the bottom plate, such that the top plate is located above the bottom plate when the shaft is oriented with the threaded, end pointed downward and the post in the top plate extends into a space defined on two sides by sections 2 and 3 of side 3 of the bottom plate when the top plate and the bottom plate are aligned such that the sides of the top plate that have a length that is shorter than the length of the truck bed stake hole are parallel to side 1 and sections 1 and 3 of side 3 of the bottom plate. The post in the top piece is of sufficient length to act as a stop when the bottom piece is rotated relative to the top piece.

The shaft may further comprise a wide section located adjacent the threaded end, such that the wide section has a diameter greater than the diameter of the hole in the top plate. The shaft may further comprise a flagpole section adjacent the wide section, where the flagpole section is narrower than the wide section and a flag is receivable thereon. The flag may attach to the flagpole section by flag connection means. The flagpole section may terminate in a sphere, which may be removable and which may prevent the flag connection means from disengaging from the flagpole section. The flagpole section may have a narrow section adjacent to the sphere, and a snap ring shaped like a ring with a slightly larger diameter than that of the narrow section but smaller than that of the sphere and with a section of ring missing such that the snap ring may be snapped onto the narrow section over the flag connection means, thus holding the flag in place on the flagpole. The sphere prevents the snap ring from sliding off the shaft. The flagpole may also comprise a plurality of flag grip barbs, each of which may be a pointed projection and may prevent the flag connection means from disengaging from the flagpole section.

An item may be secured to a truck bed stake hole with the foregoing truck bed stake hole assembly by first inserting the threaded end of the shaft through the hole in the top plate, where the post in the top plate extends downward when the shaft is oriented with the threaded end pointed downward. The next step is threadably receiving the threaded end of the shaft through the threaded hole in the bottom plate. Next is leaving a gap between the top plate and the bottom plate. The next steps are aligning the top plate and the bottom plate such that the post in the top plate extends into the space defined on two sides by sections 2 and 3 of side 3 of the bottom plate, and inserting the assembly into the truck bed stake hole such that the bottom plate is located entirely below the rim of the truck bed stake hole and the top piece of the top plate is located on top of the truck bed stake hole. The final step is rotating the shaft clockwise such that the bottom plate rotates within the truck bed stake hole until the bottom plate becomes wedged within the truck bed stake hole and cannot be removed from the truck bed stake hole by lifting the shaft straight up without turning the shaft.

The truck bed stake hole assembly may be removed from the truck bed stake hole by first rotating the shaft counter-clockwise such that the bottom plate rotates within the truck bed stake hole until section 3 of side 3 of the bottom plate comes into contact with the post in the top plate, which post prevents further rotation by the bottom plate, and then lifting the shaft straight up until the assembly is clear of the truck bed stake hole.

A better understanding of the invention will be obtained from the following detailed description of the preferred embodiment taken in conjunction with the drawings and the attached claims.

BRIEF DESCRIPTION OF THE DRAWINGS

FIG. 3 is a perspective view of the top plate as viewed from below;

FIG. 4 is an exploded perspective view of the assembly;

DETAILED DESCRIPTION OF THE PREFERRED EMBODIMENT

It is to be understood that the invention that is now to be described is not limited in its application to the details of the construction and arrangement of the parts illustrated in the accompanying drawings. The invention is capable of other embodiments and of being practiced or carried out in a variety of ways. The phraseology and terminology employed herein are for purposes of description and not limitation.

Figure 1:
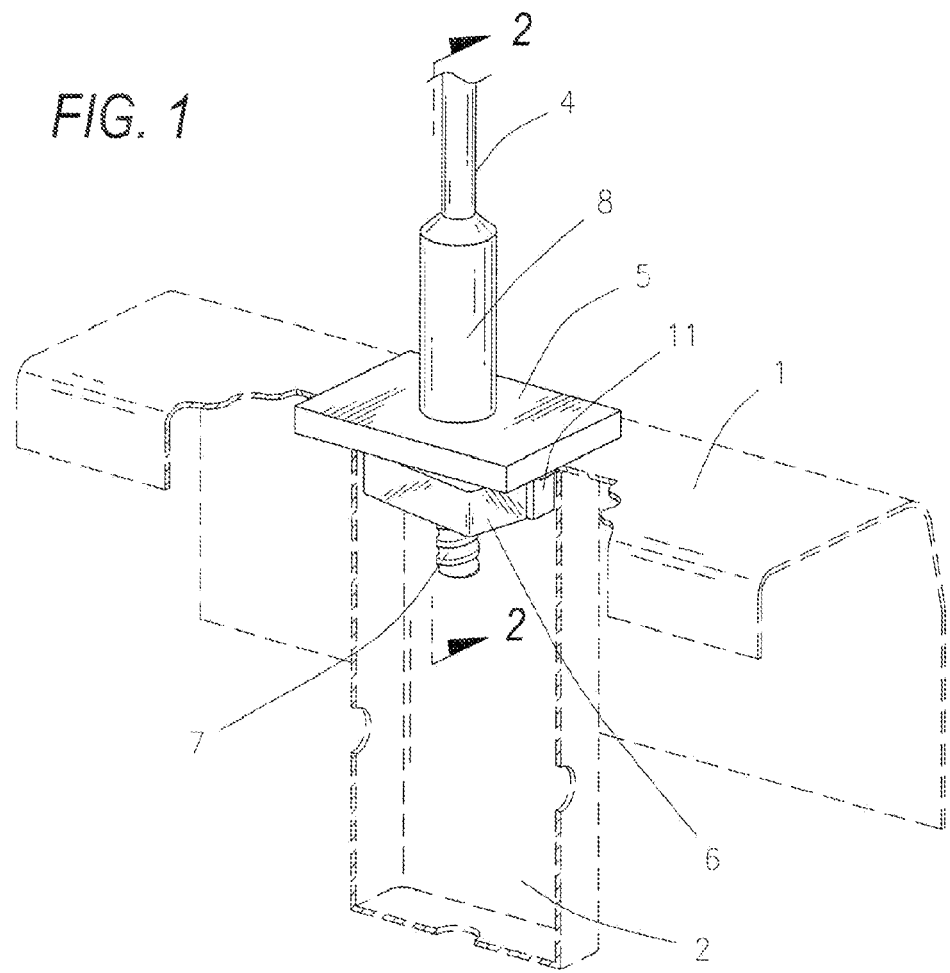
FIG. 1 is a perspective view of the assembly in place in a truck bed stake hole.
Figure 2:
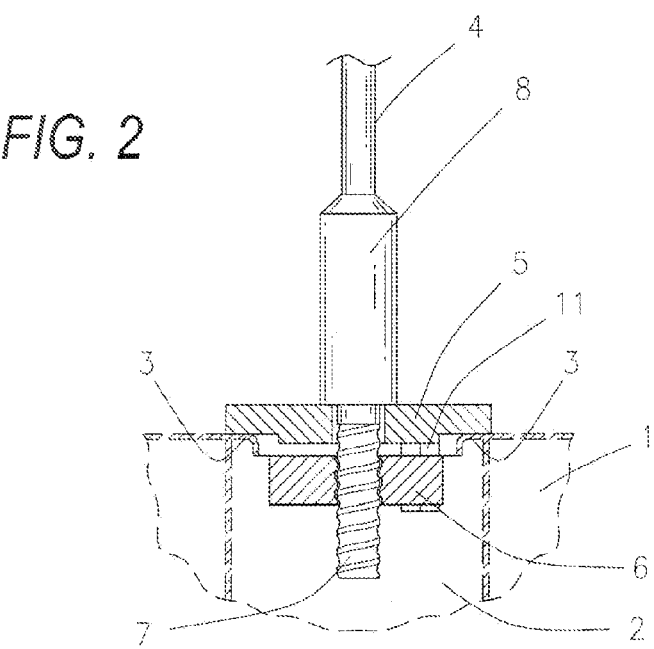
FIG. 2 is a cross section of the assembly in place in a truck bed stake hole.

The truck bed stake hole assembly, as seen in FIGS. 1 and 2, is an assembly used to attach various items, such as a flagpole, to a truck bed via its stake hole. It is easy to use, and may be installed in seconds by merely inserting and rotating the assembly within the truck bed stake hole, and removed just as quickly by rotating and removing the assembly. The truck bed stake hole assembly includes a mechanical stop to prevent over-rotation of the assembly during removal, thus simplifying and quickening the removal process. Despite its ease of use, the assembly provides a secure hold of the items attached to the assembly, even when the truck is driven at high speeds.

A truck bed stake hole is a hole in the top of a truck bed side wall 1. Such a hole often allows entry to an enclosed area 2 below the hole. The top of the truck bed side wall 1 typically extends over the edges of the enclosed area 2 such that it forms lips 3, rendering the hole in the top of the truck bed side wall 1 smaller than the cross-sectional area of the enclosed area 2.

The truck bed stake hole assembly is comprised of at least three parts: a shaft 4, a top plate 5, and a bottom plate 6. The shaft has a threaded end 7. Furthermore, the shaft may have a wide section 8 located adjacent the threaded end 7. The wide section 8 need not be immediately adjacent the threaded end 7, but may be spaced from the threaded end 7. The wide section 8 may be formed of solid material or hollow material, and may be a solid cylinder, a series of aligned rings, a solid cylinder with hollowed-out portions, or any other appropriate formation.

As seen in FIG. 3, the top plate 5 is generally rectangular in shape, with a ton piece 9 and a downward projecting post 11. The top plate may also have a bottom piece 10. Please note that, for the sake of illustration. FIG. 3 depicts the top plate 5 lying on its top, such that, the top piece 9 is below the bottom piece 10, and the post 11 is upward projecting rather than downward projecting, as it is when oriented for use. The top piece 9 is wider than the width of a truck bed stake hole and longer than the length of a truck be stake hole. This allows the top plate 5 to be placed over the truck bed stake hole without falling into the truck bed stake hole.

The bottom piece 10, when included in the top plate 5, extends downward from the top piece 9, may be centered laterally on the top piece 9, and may have rounded corners. The rounded corners prevent damage to the lips 3 of the truck bed stake hole when the truck bed stake hole assembly is in place. The bottom piece 10 is slightly narrower than the width of a truck bed stake hole and slightly shorter than the length of a truck bed stake hole. This allows the bottom piece 10 to fit within the truck bed stake hole such that the top plate 5 is unable to move laterally due to the interaction of the bottom piece 10 and the truck bed stake hole lips 3.

The post 11 extends downward from the bottom piece 10 when a bottom piece is included in the top plate 5, and from the top piece 9 when a bottom piece is not included. When a bottom piece 10 is included, the post 11 is located in one corner of the bottom piece 10. The post 11 may have a cross-section that is five-sided and shaped roughly like a square with a corner cut off, with the corner opposite the missing corner fitting into the corner of the bottom piece 10.

The top plate 5 may be formed of solid material or of hollow material, and may or may not further comprise cutout sections to reduce materials.

There is a hole 12 in the top plate 5, and the hole may be centered in the top plate 5. The hole 12 has a diameter slightly larger than the diameter of the threaded end 7 of the stake 4, but smaller than the diameter of the wide section 8, if the stake 4 has a wide section 8.

As seen in FIG. 4, the bottom plate 6 is roughly rectangular and has four sides 13-16. Side 13 is shorter than the length of a truck bed stake hole, but longer than the width of a truck bed stake hole. Side 14 is adjacent to and perpendicular to side 13 and is shorter than the width of a truck bed stake hole. Side 16 is adjacent to and perpendicular to side 13, parallel to side 14, and shorter than side 14. Side 15 has three sections 17-19. Section 17 is adjacent to and perpendicular to side 14, is parallel to side 13, and is roughly half the length of side 13. Section 19 is adjacent to and perpendicular to side 16, is parallel to side 13, and is roughly one-quarter of the length of side 13. Section 18 may be outwardly curved and is adjacent to and connects sections 17 and 19. When the top plate 5 has a bottom piece 10, side 14 is roughly the same length as the short side of bottom piece 10 and side 13 is roughly the same length as the long side of bottom piece 10. There is a hole 20 in the bottom plate 6, which may be centered in the bottom plate 6. The hole 20 is threaded such that the threaded end 7 of the shaft 4 is threadably receivable therein. The corners of the bottom plate 6 may be curved.

As with top plate 5, bottom plate 6 may be formed of solid material or of hollow material, and may or may not further comprise cutout sections to reduce materials.

Post 11 and the space defined on two sides by sections 18 and 19 of side 15 are aligned in the top plate 5 and the bottom plate 6, respectively, such that post 11 fits in the space defined on two sides by sections 18 and 19 of side 15 of the bottom plate 6 when the threaded end 7 is placed in the hole 12 in the top plate 5, such that the post 11 extends downward when the end of the threaded end 7 extends downward, and then the threaded end 7 is threadably received in hole 20 in the bottom plate 6, and the top plate 5 and the bottom plate 6 are aligned such that their respective long sides are parallel to each other and their respective short sides are parallel to each other. Post 11 is long enough to act as a stop when the bottom plate 6 is rotated relative to the top plate 5.

To use, the truck bed stake hole assembly is assembled as described in the preceding paragraph, and as seen in FIG. 4. A space should be left between the top plate 5 and the bottom plate 6. This space accommodates the lips 3 when the assembly is in place. Once assembled, with the top plate 5 and bottom plate 6 aligned such that the post 11 extends into the space defined on two sides by sections 18 and 19 of side 15 of the bottom plate 6, the bottom plate 6 is inserted into the truck bed stake hole. As seen in FIGS. 1 and 2, the bottom plate 6 thus extends below the lips 3 of the truck bed stake hole, while the top plate 5 rests on top of the truck bed stake hole. If the top plate 5 has a bottom piece 10, the bottom piece extends into the truck bed stake hole, but not necessarily past the lips 3. This prevents the top plate 5 from sliding or rotating excessively.

The next step is to rotate the shaft 4. Because the bottom piece 6 is threadably engaged with the threaded end 7 of the shaft 4, rotating the shaft 4 also rotates the bottom plate 6. However, the top plate 5 does not rotate, as the hole 12 has a greater diameter than that of the threaded end 7 of the shaft 4, and in fact cannot rotate if the top plate 5 has the bottom piece 10 extending into the truck bed stake hole. Therefore, the top plate 5 remains in place above the truck bed stake hole while the bottom plate 6 rotates within the truck bed stake hole.

Figure 5:
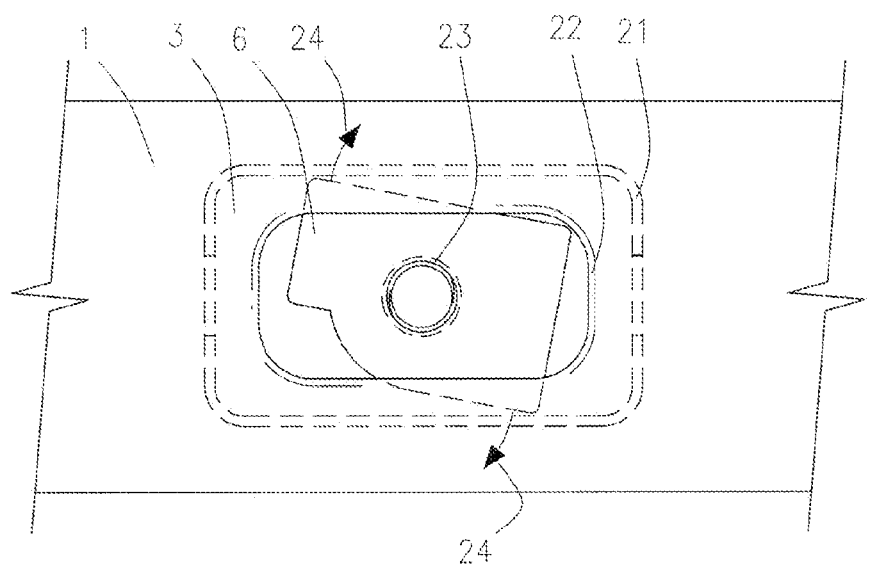
FIG. 5 is a top view of the bottom plate in place in a truck bed stake hole, with the top plate and shaft indicated by dashed lines for clarity.

The shaft 4, and consequently the bottom plate 6, is rotated until the bottom plate 6 wedges within the truck bed stake hole, as seen in FIG. 5. In FIG. 5, dashed lines 21 indicate the location of the walls of the enclosed area 2 of the stake hole. The lips 3 are defined by the area between the side walls of the enclosed area 2, denoted by dashed lines 21, and the truck bed stake hole opening 22. Dashed lines 21 also indicate the location of the top plate 5 resting atop the truck bed side wall 1. Dashed line 23 denotes the location of the shaft 4 running through the top plate 5 and the bottom plate 6. The bottom plate 6 has been rotated clockwise in the direction of arrows 24 such that bottom plate 6 is wedged against the side walls of the enclosed area of the truck bed stake hole. The bottom plate 6 cannot be lifted straight up from the truck bed stake hole while in this position because lips 3 prevent such movement.

Figure 6:
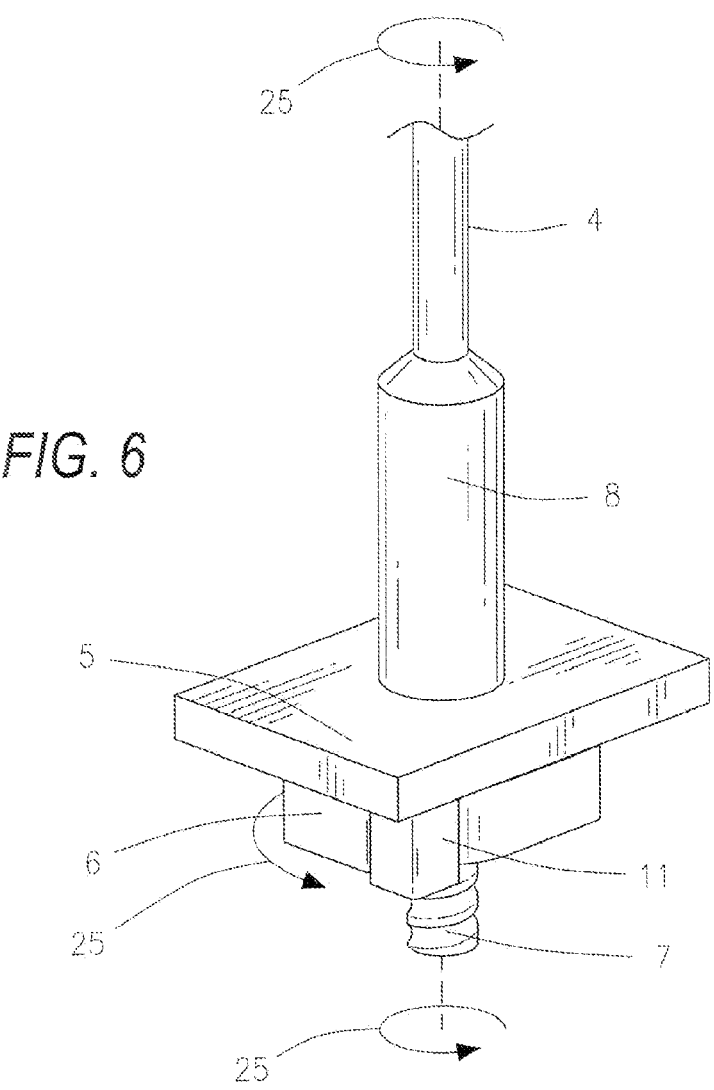
FIG. 6 is a perspective view of the assembly.

To remove the assembly from the truck bed stake hole, the shaft 4, and consequently the bottom plate 6, is rotated counterclockwise, as seen in FIG. 6, in the direction of arrows 25. The bottom plate 6 can rotate only until section 19 of side 15 of bottom plate 6 hits the post 11 extending downward from the top plate 5. The post 11 thus acts as a stop, preventing further rotation of bottom plate 6. When bottom plate 6 is thus aligned, it may be removed from the truck bed stake hole by lifting the assembly straight up, as such movement is no longer prevented by lips 3. The use of post 11 as a stop prevents over-rotation of the bottom plate 6 such that bottom plate 6 becomes wedged within the truck bed stake hole in the opposite direction. Thus, bottom plate 6 is always perfectly aligned for removal from the truck bed stake hole when it hits post 11, which increases ease and speed of removal of the assembly from the truck bed stake hole.

Figure 8:
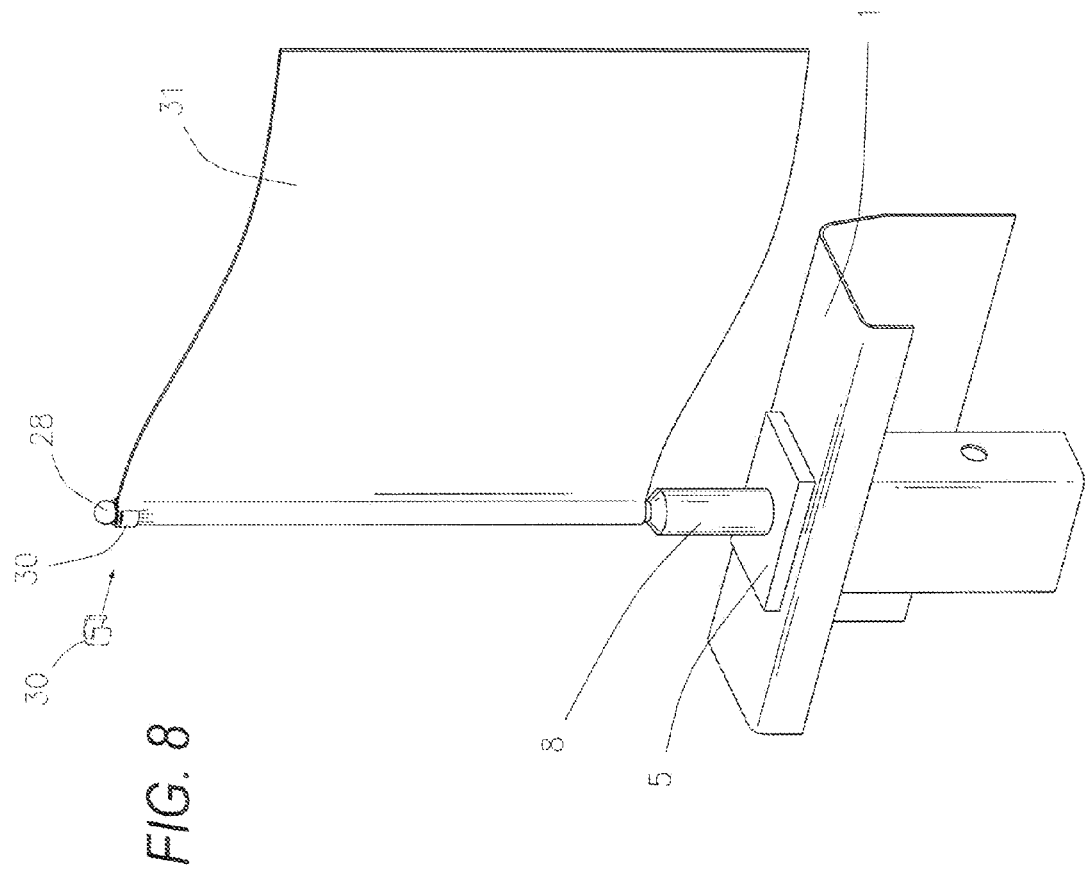
FIG. 8 is a perspective view of the assembly with the shaft comprising a flagpole with a flag on the flagpole and the assembly in place in a truck bed stake hole.
Figure 7:
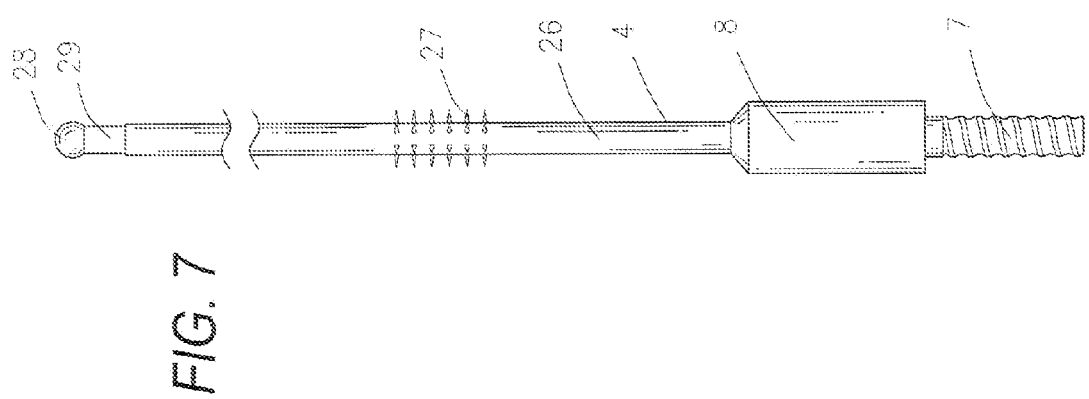
FIG. 7 is a side view of the shaft comprising a flagpole.

There are many uses for the truck bed stake hole assembly. The truck bed stake hole assembly may be adapted for use attaching anything one desires to attach to a track bed. In one such adaptation, the truck bed stake hole assembly may further comprise a flagpole for use flying a flag from the truck bed, as seen in FIGS. 7 and 8. The shaft 4 may further comprise a flagpole section 26 adjacent the wide section 8. The flagpole section 26 may be narrower than the wide section 8. The flagpole section 26 may further comprise a plurality of flag grip barbs 27. Each flag grip barb 27 may be a pointed projection from the flagpole section 26. The flag grip barbs 27 prevent a flag 31 attached to the flagpole section 26 from sliding on the flagpole section 26 and either becoming bunched on or sliding off of the flagpole section 26.

The flagpole section 26 may terminate in a sphere 28. The sphere 28 may or may not be removable from the flagpole section 26. The sphere 28 may prevent a flag 31 attached to the flagpole section 26 from sliding off of the end of the flagpole section 26. The flagpole section 26 may further comprise a narrow section 29 immediately adjacent the sphere 28. A snap ring 30 may be clipped over the means for attaching a flag 31 to the flagpole section 26 over the narrow section 29. Because the narrow section 29 is narrower than the flagpole section 26 or the sphere 28, the snap ring cannot slide along or off of the shaft 4. The snap ring thus prevents movement of the flag 31 along the shaft 4. FIG. 8 shows the assembly comprising a flagpole and flag in place in a truck bed stake hole in truck bed side wall 1.

While the invention has been described with a certain degree of particularity, it is manifest that many changes may be made in the details of construction and the arrangement of components without departing from the spirit and scope of this disclosure. It is understood that the invention is not limited to the embodiments set forth herein or purposes of exemplification, but is to be limited only by the scope of the attached claims, including the full range of equivalency to which each element thereof is entitled.

What is claimed is:

1. A truck bed stake hole assembly for use in a truck bed stake hole having a length and a width, the truck bed stake hole assembly comprising:
   a shaft with a threaded end;
   a bottom plate with sides a, b, c, and d, where:

sides a, b, c, and d generally comprise a rectangle with a corner missing, where sides a and c are generally parallel to each other and sides b and d are generally parallel to each other;

side a is shorter than the length of said truck bed stake hole but longer than the width of said truck bed stake hole;

side b is perpendicular to and adjacent to side a and is shorter than the width of said truck bed stake hole;

side d is perpendicular to and adjacent to side a, is parallel to side b, and is shorter than side b; and side c is comprised of sections c1, c2, and c3, where:
section c1 is perpendicular to and adjacent to side b, is parallel to side a, and is shorter than the length of side a;
section c3 is perpendicular to and adjacent to side d, is parallel to side a, and is shorter than the length of side a; and
section c2 is adjacent to sections c1 and c3 such that section c2 connects sections c1 and c3;

a threaded hole in said bottom plate in which said threaded end of said shaft is threadably receivable;

a top plate comprising:
a top piece that is generally rectangular in shape, that has a length that is longer than the length of said truck bed stake hole, and that has a width that is wider than the width of said truck bed stake hole; and
a post extending downward from said top piece; and a hole in said top plate that is slightly larger than said threaded end of said shaft; where said threaded end of said shaft extends through said hole in said top plate and through said threaded hole in said bottom plate such that:

said top plate is located above said bottom plate when said shaft is oriented with said threaded end pointed downward; and said post in said top plate extends into a space defined on two sides by sections c2 and c3 of side c of said bottom plate when said top plate and said bottom plate are aligned such that the sides of said top plate that have said length that is longer than the length of said truck bed stake hole are parallel to side a and sections c1 and c3 of side c of said bottom plate, where said post is of sufficient length to act as a stop when said bottom plate is rotated relative to said top plate.

2. The truck bed stake hole assembly of claim 1 where the corners of said bottom plate are curved.

3. The truck bed stake hole assembly of claim 1 where the top plate further comprises a bottom piece that projects from the bottom of said top piece, that is generally rectangular in shape, that has sides roughly parallel to the sides of said top piece, and that has a length that is shorter than the length of said truck bed stake hole and a width that is narrower than the width of said truck bed stake hole such that said bottom piece is receivable in said truck bed stake hole, where said length is approximately equal to the length of side a of said bottom plate and said width is approximately equal to the length of side b of said bottom plate, and where said post is located in a corner of said bottom piece.

4. The truck bed stake hole assembly of claim 3 where the corners of said bottom piece of said top plate are curved.

5. The truck bed stake hole assembly of claim 3 where said post has a cross section comprised of sides p1, p2, p3, p4, and p5, where:
side p1 is perpendicular to and adjacent to side p2;
side p3 is perpendicular to and adjacent to side p2;
side p5 is perpendicular to and adjacent to side p1;
at least one of sides p3 and p5 is shorter than sides p1 and p2; and
side p4 is adjacent to sides p3 and p5,
where sides p1 and p2 are aligned with and located in said corner of said bottom piece of said top plate.

6. The truck bed stake hole assembly of claim 5, where sides p1 and p2 are of equal length and sides p3 and p5 are of equal length and are shorter than sides p1 and p2, such that sides p1, p2, p3, p4, and p5 form a square with one corner cut off.

7. The truck bed stake hole assembly of claim 3 where said bottom piece is laterally centered in said top plate.

8. The truck bed stake hole assembly of claim 1 where said threaded hole in said bottom plate is centered in said bottom plate.

9. The truck bed stake hole assembly of claim 1 where said hole in said top plate is centered in said top plate.

10. The truck bed stake hole assembly of claim 1 where said shaft further comprises a wide section located adjacent said threaded end such that said wide section has a diameter greater than the diameter of said hole in said top plate.

11. The truck bed stake hole assembly of claim 10 where said shaft further comprises a flagpole section adjacent to said wide section where said flagpole section is narrower than said wide section and a flag is receivable thereon.

12. The truck bed stake hole assembly of claim 11 further comprising a flag.

13. The truck bed stake hole assembly of claim 12 where said flag attaches to said flagpole section by flag connection means.

14. The truck bed stake hole assembly of claim 13 where said flag connection means comprises a side of said flag folded over and secured to said flag such that said side of said flag forms a sleeve into which said flagpole section is receivable.

15. The truck bed stake hole assembly of claim 13 where said flag connection means comprises a plurality of loops connected to said flag into which said flagpole section is receivable.

16. The truck bed stake hole assembly of claim 13 where said flagpole section terminates in a sphere.

17. The truck bed stake hole assembly of claim 16 where said sphere is removable from said flagpole section.

18. The truck bed stake hole assembly of claim 16 where said sphere prevents said flag connection means from disengaging from said flagpole section.

19. The truck bed stake hole assembly of claim 16 further comprising a snap ring, where:
said flagpole section further comprises a narrow section adjacent to said sphere where said narrow section is narrower than said flagpole section; and
said snap ring is shaped like a ring with a slightly larger diameter than that of said narrow section but smaller than that of said sphere and with a section of said ring missing such that said snap ring may be snapped onto said narrow section over said flag connection means to hold said flag in place on said flagpole and said sphere prevents said snap ring from sliding off said shaft.

20. The truck bed stake hole assembly of claim 13 where said flagpole section further comprises a plurality of flag grip barbs on said flagpole section.

21. The truck bed stake hole assembly of claim 20 where said each of said flag grip barbs is a pointed projection from said flagpole section.

22. The truck bed stake hole assembly of claim 20 where said flag grip barbs prevents said flag connection means from disengaging from said flagpole section.

23. A method of securing an item to a truck bed stake hole with the truck bed stake hole assembly of claim 1 comprising:
- inserting said threaded end of said shaft through said hole in said top plate, where said post in said top plate extends downward when said shaft is oriented with said threaded end pointed downward;
- threadably receiving said threaded end of said shaft through said threaded hole in said bottom plate;
- leaving a gap between said top plate and said bottom plate on said threaded end of said shaft;
- aligning said top plate and said bottom plate such that said post in said top plate extends into said space defined on two sides by sections c2 and c3 of side c of said bottom plate;
- inserting said assembly into said truck bed stake hole such that said bottom plate is located entirely below a lip of said truck bed stake hole and said top piece of said top plate is located on top of said truck bed stake hole;
- rotating said shaft clockwise such that said bottom plate rotates within said truck bed stake hole until said bottom plate becomes wedged within said truck bed stake hole and cannot be removed from said truck bed stake hole by lifting said shaft straight up without turning said shaft.

24. A method of removing an item secured to a truck bed stake hole with the truck bed stake hole assembly of claim 1 comprising:
- rotating said shaft counterclockwise such that said bottom plate rotates within said truck bed stake hole until said section c3 of said side c of said bottom plate comes into contact with said post in said top plate, said post prevents further rotation by said bottom plate; and
- lifting said shaft straight up until said assembly is clear of said truck bed stake hole.

* * * * *